| United States Patent [19] | [11] Patent Number: 4,988,742 |
|---|---|
| Moon et al. | [45] Date of Patent: Jan. 29, 1991 |

[54] TACKIFIED TERPOLYMER ADHESIVES

[75] Inventors: John D. Moon, Hastings; Margaret M. Sheridan; Francis M. Stark, Jr., both of St. Paul, all of Minn.

[73] Assignee: Minnesota Mining and Manufacturing Company, St. Paul, Minn.

[21] Appl. No.: 238,901

[22] Filed: Sep. 2, 1988

[51] Int. Cl.$^5$ .............................................. C08F 2/46
[52] U.S. Cl. ...................................... 522/79; 524/272
[58] Field of Search ........................... 524/272; 522/79

[56] References Cited

U.S. PATENT DOCUMENTS

| Re. 24,906 | 12/1960 | Ulrich | 206/59 |
|---|---|---|---|
| 3,615,972 | 10/1971 | Morehouse, Jr. | 156/79 |
| 3,888,247 | 6/1975 | Stenvall | 128/155 |
| 4,075,238 | 2/1978 | Mark et al. | 260/458 |
| 4,181,752 | 1/1980 | Martens et al. | 427/54.1 |
| 4,243,500 | 1/1981 | Glennon | 204/159.12 |
| 4,287,308 | 9/1981 | Nakayama et al. | 521/53 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,364,972 | 12/1982 | Moon | 427/54.1 |
| 4,370,380 | 1/1983 | Shah | 428/355 |
| 4,379,201 | 4/1983 | Heilmann et al. | 428/345 |
| 4,391,687 | 7/1983 | Vesley | 204/159.16 |
| 4,418,120 | 11/1983 | Kealy et al. | 428/343 |
| 4,500,683 | 2/1985 | Hori et al. | 524/533 |
| 4,510,197 | 4/1985 | Shah | 428/220 |
| 4,599,265 | 7/1986 | Esmay | 428/355 |
| 4,645,711 | 2/1987 | Winslow et al. | 428/355 |
| 4,701,509 | 10/1987 | Sun et al. | 526/264 |
| 4,710,536 | 12/1987 | Klingen et al. | 524/493 |
| 4,749,590 | 6/1988 | Klingen et al. | 427/54.1 |
| 4,855,170 | 8/1989 | Darvell et al. | 428/317.5 |
| 4,894,259 | 1/1990 | Kuller | 427/208.8 |

OTHER PUBLICATIONS

Hawley's Condensed Chemical Dictionary, 11th Edition, edited by Bovey and Winslow.
"Physical and Chemical Examination of Paints, Varnishes, Lacquers, and Colors," Paint Testing Manual, 1972, pp. 130–149.
U.S. Ser. No. 65,657 Levens filed 7/2/87, "Heat Activatable Adhesive".
U.S. Ser. No. 84,781 Zimmerman filed 8/17/87, "Unified Pressure-Sensitive Adhesive Tape".
U.S. Ser. No. 195,693 Hicks filed 5/18/88, "Tackified Pressure-Sensitive Tape".
Hercules Product Data Numbers 7205-9 and 7115-11.

*Primary Examiner*—Melvyn I. Marquis
*Assistant Examiner*—Karen A. Hellender
*Attorney, Agent, or Firm*—Donald M. Sell; Walter N. Kirn; Darla P. Neaveill

[57] ABSTRACT

An acrylic terpolymer pressure-sensitive adhesive comprising a photopolymerized polymer containing an alkyl acrylate monomer, the alkyl groups of which have an average of 6 to 12 carbon atoms, a first polar copolymerizable monomer selected from strongly polar monomers, and a second polar monomer selected from the group consisting of strongly polar monomers and moderately polar monomers, a hydrogenated rosin ester tackifying agent, and a photoinitiator, wherein the adhesive has a lower glass transition temperature as measured by Dynamic Mechanical Thermal Analysis than would an identical acrylic terpolymer adhesive omitting the tackifying agent.

10 Claims, 4 Drawing Sheets

TACKIFIED TERPOLYMER ADHESIVES

BACKGROUND OF THE INVENTION

1. Field of the Invention

The present invention relates to photopolymerized tackified acrylic terpolymers as pressure-sensitive adhesives and to tapes made therewith.

2. Description of the Related Art

Acrylate pressure-sensitive adhesives are well known in the art. In U.S. Pat. No. Re 24,906 (Ulrich), alkyl acrylate copolymers are described which are predominately alkyl esters of acrylic acid having from 4 to 14 carbon atoms, and further comprise a minor amount of a polar copolymerizable monomer such as acrylic acid. Such adhesives are widely popular as they are readily available and provide a good balance of tack, shear and peel properties at a relatively low cost. Methods for making these adhesives involve the use of large amounts of solvent which is an effective method for polymerization of acrylate adhesives, but one which is increasingly, subject to safety and environmental restrictions.

U.S. Pat. No. 4,418,120 (Kealy et al.) discloses a pressure-sensitive adhesive tape which is made by coating a backing sheet with a solution of isooctyl acrylate/acrylic acid copolymer containing a tackifying rosin ester and an antioxidant, evaporating the solvent, and cross-linking the adhesive. This process also involves the use of large amounts of solvent.

U.S. Pat. No. 4,500,683 (Hori et al.) discloses a pressure-sensitive adhesive composition containing as a polymer component, an addition-polymerization polymer of an acrylate based polymer having sticking properties at room temperature and one or more ethylenically unsaturated monomers capable of forming a homopolymer or copolymer having a glass transition point of at least 273° K. The addition-polymerization polymer is prepared by polymerizing one or more ethylenically unsaturated monomers in the presence of the acryl-based polymer by solution polymerization or bulk polymerization using radical polymerization catalysts, but polymerization can be initiated by energy in the form of light, etc. It is disclosed that known additives such as "a coloring agent, fillers, an anti-aging agent, and a tackifier" may be used. No such additions are exemplified.

U.S. Pat. No. 3,888,247 (Stenvall) discloses a first aid bandage having an adhesive layer applied over a flexible, preferably microporous backing. The adhesive layer is an acrylate type pressure-sensitive copolymer adhesive as described in Ulrich, with a 94:6 ratio. The adhesive contains 40 percent of a highly stabilized ester resin tackifier, commercially available from Hercules Chemical Co. under the trade name Foral TM 85. U.S. Pat. No. 4,335,171 (Zenk) discloses a pressure-sensitive adhesive transfer tape in which the adhesive is a laminate of two physically dissimilar laminae. The first lamina is stated to be a soft pressure-sensitive adhesive consisting essentially of an isooctyl acrylate:acrylic acid copolymer wherein the acid present is in the range of 3-12% of the copolymer. The copolymer is tackified with 50 parts of a hydrogenated rosin ester or hydrogenated rosin acid.

U.S. Pat. No. 4,701,509, (Sun et al.) discloses a four-part acrylate, hot-melt, pressure-sensitive adhesive having a composition consisting of 2-ethyl hexyl acrylate, n-butyl acrylate, isobutyl methacrylate, and n-vinyl caprolactam for use on human skin. The adhesives are solution polymerized and are disclosed to have high cohesive strength. No tackifiers are disclosed for use with the adhesive.

U.S. Pat. No. 4,370,380 (Shah) discloses a hot-melt coated pressure-sensitive optically clear blend of 1-30% of a water-soluble polymer or copolymer of a vinyl lactam together with 70-99 percent of a tacky water-insoluble copolymer of an alkyl acrylate or methacrylate ester or mixture of esters and a copolymerizable monomer wherein the ester is substantially free from cross-linking. The blend can be made via mixing followed by solvent or vehicle volatilization. Polymers and copolymers of 1-vinyl-2-pyrrolidone are preferred. The use of tackifiers with these pressure-sensitive adhesives is neither disclosed or suggested. U.S. Pat. No. 4,510,197, (Shah) discloses a solvent-polymerized water-permeable pressure-sensitive adhesive comprising a modified copolymer of butyl acrylate containing N-vinyl-2-pyrrolidone and acrylic acid. The use of tackifiers is not disclosed.

U.S. Pat. No. 4,181,752 (Martens et al.) discloses a process for ultraviolet photopolymerization of alkyl acrylate esters and polar copolymerizable monomers to form the acrylate copolymer. Martens teaches that intensity and spectral distribution of the irradiation must be controlled in order to attain desirable cohesive strengths and peel resistance. The photopolymerization is preferably carried out in an inert atmosphere as oxygen tends to inhibit the reaction.

Additional patents disclose ultraviolet radiation of acrylate adhesives. U.S. Pat. No. 4,364,972 (Moon) discloses the use of N-vinylpyrrolidone as the polar copolymerizable monomer in the acrylate adhesive copolymer to provide a pressure-sensitive adhesive with high adhesion to automotive paints. U.S. Pat. No. 4,391,687 (Vesley) discloses the use of specific chromophore-substituted -halomethyl-s-triazines as photoactive crosslinkers for acrylate copolymers. U.S. Pat. No. 4,599,265 (Esmay) discloses a readily peelable pressure-sensitive adhesive tape, the adhesive layer of which is highly crosslinked and low in polar monomer content.

Benefits of ultraviolet-radiation polymerized adhesives include safety and environmental improvements due to the elimination of solvents in the processing. However, addition of tackifiers to such adhesives may be desired for certain applications. Such an addition typically results in processing difficulties. For example, the above-cited Moon patent, which concerns pressure-sensitive adhesives designed specifically to provide enhanced adhesion to automotive paints, teaches that tackifiers can be blended into the photoactive mixtures of monomers from which those pressure-sensitive adhesives are photopolymerized, but warns, at column 6, lines 3-12, that "the addition of any such material adds complexity and hence expense to an otherwise simple, straight forward, economical process, and is not preferred, except to achieve specific results". The Moon patent does not exemplify this teaching. However, the introduction of a tackifier into a photopolymerizable mixture of monomers often interferes with the photopolymerization and prevents the attainment of the desired adhesive and cohesive properties.

U.S. Pat. No. 4,243,500 (Glennon) discloses a pressure-sensitive adhesive formed from a composition comprising at least one monofunctional unsaturated acrylate ester monomer, essentially saturated tackifying resin polymers, non-crystallizing elastomeric material, and an initiator responsive to ultraviolet light, or other penetrating radiation. Glennon specifies the use of UV light within a wavelength range of 1800–4000 angstroms. The intensity of the lamps to which the adhesive is exposed is much higher than that of the lamps disclosed in Martens et al.

Glennon states that the tackifying resin may be a substance or mixture of substances selected from the group consisting of esters of rosin, hydrogenated esters of rosin, modified rosin esters, esters of polymerized rosin, esters of hydrogenated rosin, hydrocarbon resin, linear homopolymers of alpha-methyl styrene, alpha-pinene terpene hydrocarbon resin, aromatic modified C-5 hydrocarbon resin, vinyltoluene alpha-methyl styrene copolymer resins, beta-pinene terpene resins, polycyclic hydrocarbon resins, and technical hydroabietyl alcohol. However, many of these essentially saturated resin polymers (e.g., alphamethyl styrene materials) are unsuitable for use in the curing method of the above-cited Martens patent due to incompatibility, which results in phase-separation of the tackifying resin from the monomer mixture, excessive UV absorption which retards the photochemical reaction, and high reactivity with the monomers such that photopolymerization of the monomers is substantially prohibited. The Glennon adhesive requires the use of from about 50 parts to about 250 parts of tackifying resin per hundred parts acrylate ester monomer in order to obtain a satisfactory adhesion level. Such levels of tackifier increase the glass transition temperature and act as chain transfer agents during the polymerization. This results in the pressure-sensitive adhesives having lowered molecular weights and reduced cohesive strengths. Further, many tackifiers tend to migrate to the surface of the adhesive upon aging, deteriorating the adhesion.

U.S. Pat. No. 4,645,711, (Winslow et al.) discloses a removable pressure-sensitive adhesive tape, the adhesive layer of which is an emulsion polymerized copolymer of alkyl acrylate such as isooctyl acrylate and a small amount of emulsifier monomer and a tackifying resin selected from hydrogenated rosin esters, polyterpene, polymerized alkyl styrene, and polymerized petroleum derived monomer resins. Most of these resins are unsuitable for use in in situ photopolymerized acrylate pressure-sensitive adhesives.

Applicants have now discovered that from about 5 part to about 40 part of a rosin ester based tackifier will provide flexible pressure-sensitive adhesives which can be ultraviolet-radiation polymerized and which show a surprising shift in the dynamic mechanical properties such as glass transition temperature when used in acrylic terpolymer pressure-sensitive adhesives wherein the monomers include at least one alkyl acrylate and at least one strongly polar copolymerizable monomer. Monomers and tackifier may be selected such that adhesives with a wide range of tack, peel and shear properties are possible.

SUMMARY OF THE INVENTION

An acrylic terpolymer pressure-sensitive adhesive comprising
(a) from about 60 parts to about 95 parts of a photopolymerized polymer of monomers containing:
 (1) from about 60 parts to about 96 parts of an alkyl acrylate monomer, the alkyl groups having an average of 6 to 12 carbon atoms,
 (2) from about 2 parts to about 15 parts of a first polar copolymerizable monomer, said polar monomer being a strongly polar monomer, and
 (3) from about 2 parts to about 25 parts of a second polar copolymerizable monomer selected from the group consisting of strongly polar and moderately polar monomers,
(b) correspondingly, from about 40 parts to about 5 parts of a hydrogenated rosin ester tackifying agent, and
(c) from about 0.01 to about 1 part of a photoinitiator, wherein said adhesive has a lower glass transition temperature than would an identical acrylic terpolymer adhesive omitting such a tackifying agent.

In one embodiment, the present invention provides tackified acrylic pressure-sensitive adhesives with significantly improved shear and adhesion to low energy substrates. By carefully selecting monomer ratios and amount of tackifying agent, adhesives may be custom designed with a wide range of properties such as tack and shear.

As used herein, the terms "tackifier", "tackifying agent", and "tackifying resin" are synonymous, and refer to those hydrogenated rosin esters useful in pressure-sensitive adhesives of the invention.

All ratios, percentages, and parts used herein are by weight unless specifically stated otherwise.

DETAILED DESCRIPTION OF THE INVENTION

Figure 1:
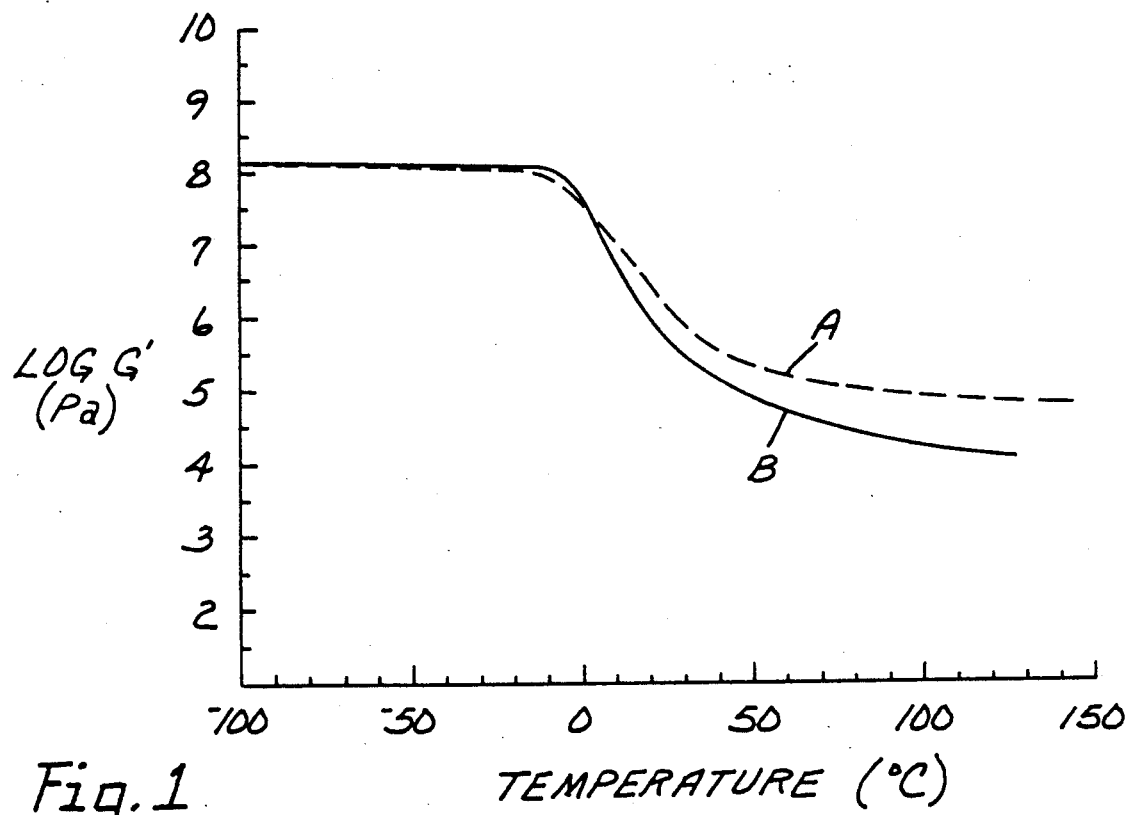
FIG. 1 is a plot of the log of the storage modulus (G') in Pascals as determined by Dynamic Mechanical Thermal Analyzer (DMTA) in relation to the temperature in degrees Celsius for the adhesive compositions of Comparative Example 1-C (Line A), and Example 1 (Line B).

The acrylic terpolymer pressure-sensitive adhesives of the present invention contain an alkyl acrylate monomer, and two polar copolymerizable monomers. The alkyl acrylate monomer is preferably a monofunctional unsaturated acrylate ester of non-tertiary alkyl alcohol, the molecules of which have from 6 to about 12 carbon atoms. Included within this class of monomers are, for example, isooctyl acrylate, isononyl acrylate, 2-ethylhexyl acrylate, decyl acrylate, dodecyl acrylate, and hexyl acrylate. Preferred monomers include isooctyl acrylate, isononyl acrylate, and dodecyl acrylate. Alkyl acrylates having an average of less than 6 carbon chains are not useful in terpolymers of the invention.

The polar copolymerizable monomers are selected such that a first polar monomer is selected from strongly polar monomers such as acrylic acid, itaconic acid, hydroxyalkyl acrylates, cyanoalkyl acrylates, acrylamides or substituted acrylamides, and a second polar monomer is selected from either strongly polar monomers such as those listed above, or moderately polar monomers such as N-vinyl pyrrolidone, N-vinyl caprolactam, acrylonitrile, vinyl chloride or diallyl phthalate. The alkyl acrylate ester preferably comprises from about 60 parts to about 96 parts of the terpolymer, more preferably from about 70 parts about 85 parts. The first polar copolymerizable monomer preferably comprises up to about 10 parts. The second polar copolymerizable monomer preferably comprises up to about 20 parts, more preferably from 10 parts to about 15 parts of the photopolymerized terpolymer.

The acrylic terpolymer pressure-sensitive adhesive compositions of the present invention contain from about 5 parts to about 40 parts, preferably from about 10 parts to about 35 parts, more preferably from about 25 parts to about 35 parts of a hydrogenated rosin ester tackifying agent. Rosin esters have a higher softening point than unmodified rosins, and higher molecular weight. Ethylene glycol, glycerol, and pentaerythritol are the most common alcohols used for esterification. Rosin esters are quite stable, and resistant to hydrolysis, and such stability increases with hydrogenation. Acrylic ultraviolet-radiation photopolymerized pressure-sensitive adhesives tackified with hydrogenated rosin ester tackifying agents show improved adhesion over solvent-polymerized acrylic pressure-sensitive adhesives containing about 4 to 8 times as much rosin ester tackifier.

Preferred tackifying agents are highly hydrogenated, e.g., hydrogenated glycerine esters commercially available from companies such as Hercules Inc., under such trade names as Foral™, and Pentalyn™. Individual tackifiers include Foral™ 65, Foral™ 85, and Foral™ 105. Tackifiers useful in the invention have softening temperatures of from about 65° C. to about 110° C. Tackifiers useful in adhesive compositions of the invention do not substantially prohibit the UV curing of the photopolymerizable terpolymer when used in the moderate amounts required for compositions of the invention. Many rosin and rosin ester based systems will totally or substantially prohibit ultraviolet-radiation curing when used in effective amounts, and so are not useful in systems of the invention.

Figure 3:
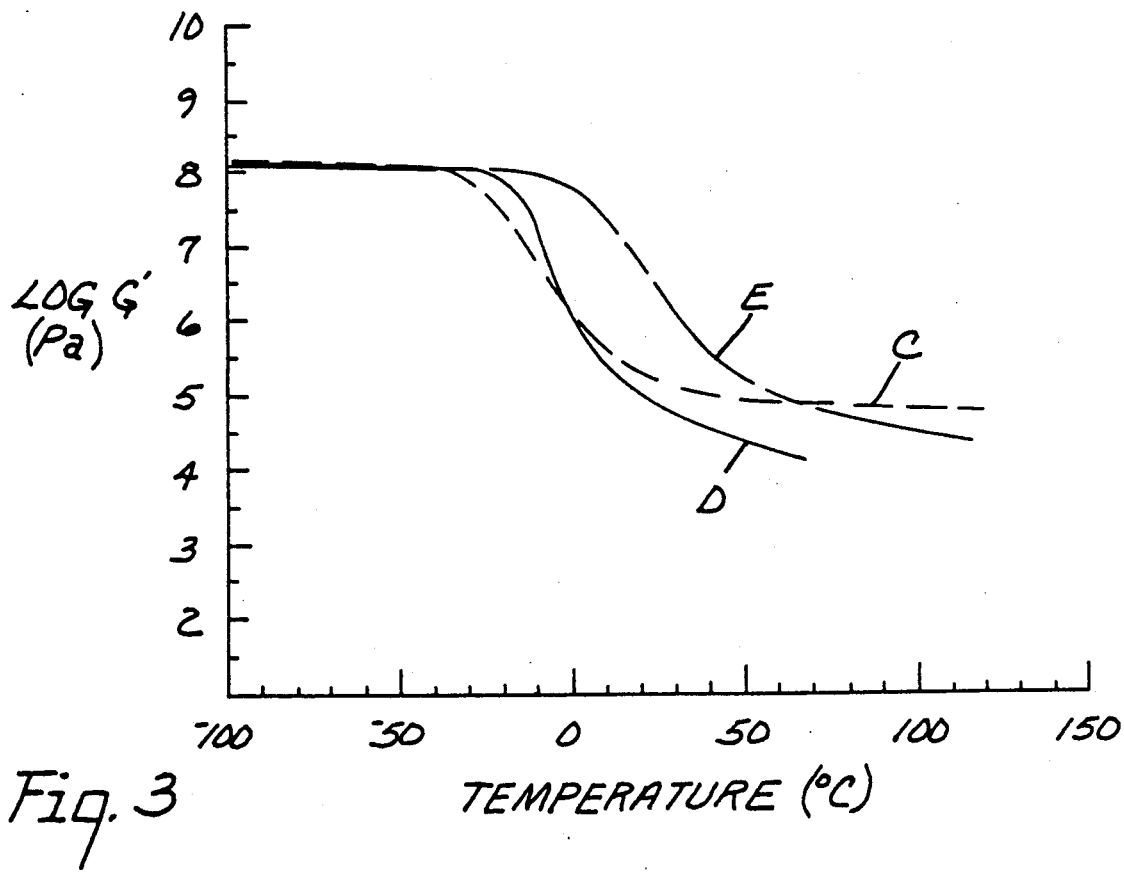
FIG. 3 is a plot of the log storage modulus (G') as determined by DMTA in relation to the temperature in degrees Celsius for the adhesive compositions in Examples 2-C (Line C) and 2-$C_2$ (Line E) and Example 2 (Line D).
Figure 4:
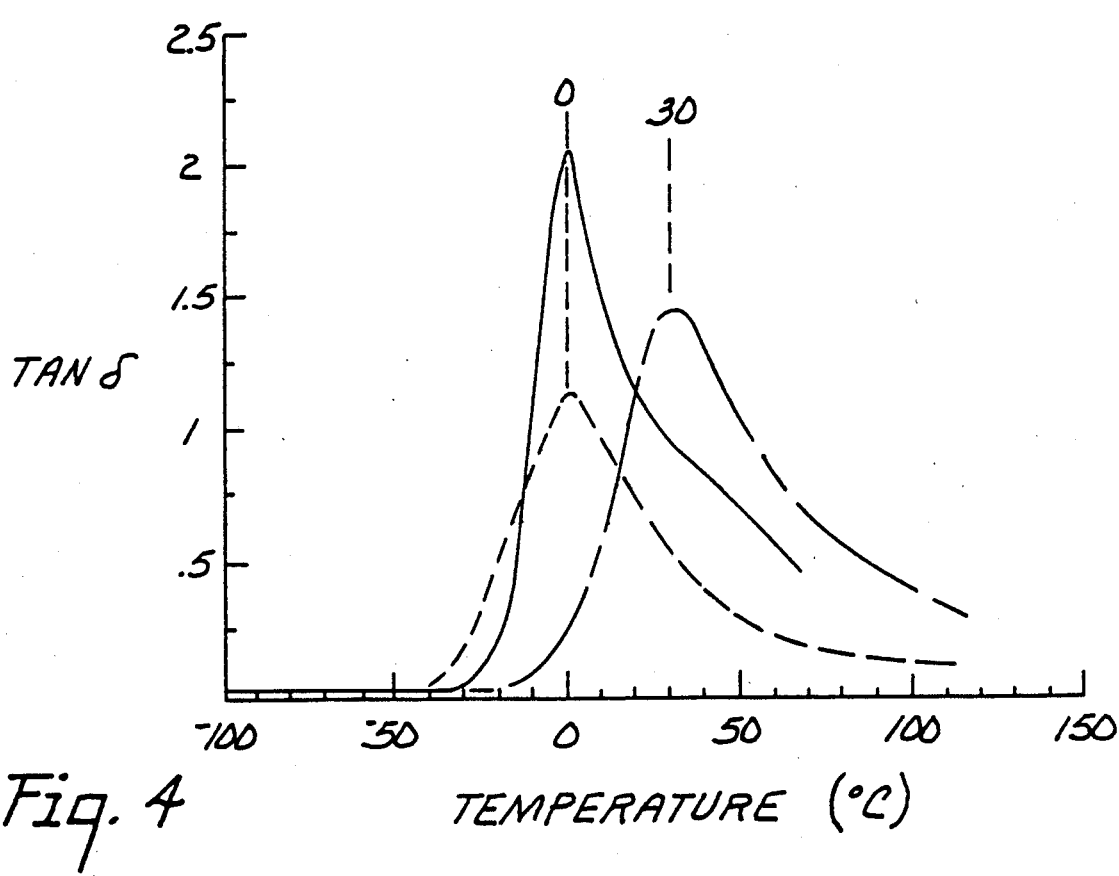
FIG. 4 is a plot of the dampening maxima (tan δ) as determined by DMTA in relation to the temperature in degrees Celsius for the adhesive compositions in Examples 2(Line D), 2-C (Line C)-and 2-$C_2$ (Line E).

Surprisingly, the addition of these tackifiers to the acrylic terpolymers described above cause a decrease in the glass transition temperature ($T_g$) of the adhesive composition, as measured by Dynamic Mechanical Thermal Analyzer (DMTA). When DMTA data for adhesive terpolymers of the invention is plotted as a function of log time or temperature, the graphs show certain common characteristics; these include a sharpening of the transition zone, and an increase in the value of the dampening maxima (tan $\delta$), which is shifted to lower temperatures. (The tan $\delta$ correlates to the glass transition temperature of the polymer.) The addition of tackifying agents typically raise the $T_g$ of a polymer when measured by DMTA, as shown by line E, in FIGS. 3 and 4, wherein 30 weight percent of isobornyl methacrylate, a non-rosin ester based tackifying agent is used in an otherwise identical acrylic terpolymer adhesive. As these figures show, the addition of other conventional tackifying agents shifts the tan $\delta$ to higher temperatures.

Without wishing to be bound by theory, it is believed that the tackifier performs a dual function in the system, plasticizing as well as tackifying the adhesive. The effects of the tackifier on the terpolymer system is due to such factors as the amount of tackifier, the chain transfer properties and polarity of the specific tackifier resins used herein and the strong hydrogen bonding between the polar monomers in the adhesive polymer chain. By interfering with such hydrogen bonding, the tackifier may reduce the number of transition states available. This would account for the observed sharpening of the transition zone in the graphs described above, and shift to lower temperatures of the tan $\delta$ of the terpolymer.

The amount of the tan $\delta$ shift varies with such factors as the polarity of the tackifying resin selected, the ratios of polar monomers, and the polarity of the specific monomers utilized. Where the polar copolymerizable monomers are selected such that both the first and second monomers are strongly polar, the observed shift in the tan $\delta$ is larger than where one of the monomers is a moderately polar monomer.

The terpolymer compositions also contain a photoinitiator to induce polymerization of the monomers. Photoinitiators which are useful include the benzoin ethers such as benzoin methyl ether or benzoin isopropyl ether, substituted benzoin ethers such as anisole methyl ether, substituted acetophenones such as 2,2-diethyoxyacetophenone and 2,2-dimethoxy-2-phenyl acetophenone, substituted alpha-ketols such as 2-methyl-2-hydroxy propiophenone, aromatic sulfonyl chlorides such as 2-naphthalene sulfonyl chloride, and photoactive oximes such as 1-phenyl-1,1-propanedione-2-ethoxycarbonyl)-oxime. The photoinitiator is present in an amount of about 0.01 part to about 1 part by weight based on 100 parts of the monomers plus the tackifying agent hereinafter called parts per hundred resin (phr).

Where superior cohesive strengths are desired, the pressure-sensitive adhesive matrix of the novel tape should be cross-linked. Preferred crosslinking agents for an acrylic pressure-sensitive adhesive are multiacrylates such as 1,6-hexanediol diacrylate as well as those disclosed in U.S. Pat, No 4,379,201 (Heilman et al.), incorporated herein by reference. Crosslinking is especially easy to control when photopolymerizing the monomer in admixture with a multiacrylate crosslinking agent. Other types of crosslinking agents are also useful, e.g., any of the triazine crosslinking agents taught in U.S. Pat. No. 4,330,590 (Vesley), and 4,329,384 (Vesley et al.), both of which are incorporated by reference. Each of the crosslinking agents is useful in the range of from about 0.01 to about 1 phr.

The instant invention also encompasses tapes comprising at least one layer of the photopolymerized terpolymer pressure-sensitive adhesive. Tapes of the invention may comprise more than one pressure-sensitive adhesive layer. In such multilayer tapes, the pressure-sensitive adhesive layers may comprise similar or different adhesive compositions, in like or unlike thicknesses, having similar or different additives.

In some preferred tapes of the invention, the novel terpolymer adhesive may be adhered to one of several types of foams, including but not limited to acrylic foams, urethane foams, and polyethylene foams.

Where a foam-like pressure-sensitive adhesive tape is desirable, a monomer blend containing microspheres may be used as a backing or core layer. Especially preferred microspheres are polymeric microspheres. In a particularly preferred composition of the invention, the adhesive comprises hollow polymeric microspheres, such as those described in U.S. Pat. Nos. 3,615,972, 4,075,238, and 4,287,308, all of which are incorporated herein by reference. The microspheres are available from the Pierce & Stevens Company under the trade name "Microlite" in unexpanded form and "Miralite" in expanded form. Similar microspheres are available from Kema Nord Plastics under the trade name "Expancel" and from Matsumoto Yushi Seiyaku under the trade name "Micropearl". In expanded form, the microspheres have a specific density of approxim,ately 0.02–0.036 g/cc. It is possible to include the unexpanded microspheres in the pressure-sensitive adhesive composition and subsequently heat them to cause expansion, but it is generally preferred to mix the expanded microspheres into the adhesive. This process makes it easier to ensure that the hollow microspheres in the final adhesive are substantially surrounded by at least a thin layer of adhesive.

Polymeric microspheres having an average diameter of 10 to 200 micrometers may be blended into the polymerizable composition in amounts of from about 15% to about 75% by volume prior to coating.

Also useful are glass microspheres having an average diameter of from 5 to 200 micrometers, preferably from about 20 to about 80 micrometers. Such microspheres may comprise 5% to 65% by volume of the pressure-sensitive adhesive. The pressure-sensitive adhesive layer should be at least 3 times as thick as the diameter of the glass microspheres, preferably at least 7 times.

When a microbubble-free pressure-sensitive adhesive tape is desired to be provided on a substantially non-tacky flexible support film, the film layer may comprise copolymers containing substantially the same monomers described for the novel terpolymer pressure-sensitive adhesive layer, with varying ratios of the alkyl acrylate monomer and at least one polar copolymerizable monomer. Either moderately or strongly polar monomers or both may be used in such a layer. The preferred range of the polar monomer(s) in such a layer ranges from 10% to about 60% of the total monomer mix. Such layer may also comprise a crosslinking agent and other photopolymerizable ingredients including, but not limited to alkyl vinyl ethers, vinylidene chloride, styrene, and vinyl toluene, only in amounts that do not detract from the desired properties.

Other materials which can be blended with the polymerizable monomer mixture of any of the above described layers include pigments, plasticizers, reinforcing agents, dyes, pigments, fibers and fire retardants.

An especially useful filler material is hydrophobic silica as disclosed in U.S. Pat. No. 4,710,536, and 4,749,590, (Klingen, et al.), both of which are incorporated herein by reference. In one preferred embodiment of the present invention, the pressure-sensitive adhesive layer further comprises from about 2 to about 15 phr of a hydrophobic silica having a surface area of at least 10 $m^2/g$.

The coatable compositions used in tapes of the invention, especially the pressure-sensitive compositions are preferably prepared by premixing together the photopolymerizable monomers and photoinitiator. This premix is then partially polymerized to a viscosity in the range of from about 500 cps to about 50,000 cps to achieve a coatable syrup. The tackifier is then added to the partially polymerized syrup. Alternatively, the monomers can be mixed with a thixotropic agent such as fumed silica to achieve a coatable syrup composition.

This composition is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps which provide a total ultraviolet radiation dosage of about 500 millijoules. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), incorporated herein by reference, which also teaches that such procedures will allow thick coatings to be polymerized in air.

The adhesive compositions may be coated onto a backing or substrate prior to polymerization. This may be accomplished using any conventional means such as roller coating, dip coating or extrusion coating.

As used herein, the term "tape" includes but is not limited to, those adhesive strips which are single-coated adhesive layers permanently attached to a backing or support, double-coated adhesive strips having flexible supports with an adhesive layer on both sides thereof, and adhesive strips with no support or backing, such being typically releasably attached to a low-adhesion liner, and commonly called "transfer tapes".

Where multilayer tape constructions are desirable, a preferred method of construction is multilayer coating, as described in U.S.S.N. 084,781, (Zimmerman et al.), incorporated herein by reference, wherein a plurality of copolymerizable coatable compositions is prepared, each composition containing at least one photopolymerizable monomer, one of the coatable compositions being the novel pressure-sensitive adhesive terpolymer of the invention. The coatable compositions are coated to provide a plurality of superimposed layers with contiguous layers comprising differing acrylic matrices. The contiguous layers define an interface therebetween, with the novel pressure-sensitive adhesive terpolymer of the invention being coated as a first or last layer. Migration of photopolymerizable monomers through the interface between contiguous layers is permitted, and the superimposed layers are then simultaneously irradiated. This provides polymeric chains comprised of copolymers of photopolymerizable monomers originating from each contiguous layer extending through the interface between contiguous layers, producing a tape having layers which cannot be delaminated.

The following tests may be used to evaluate tapes of the invention.

TEST METHODS

Dynamic Mechanical Testing

Dynamic mechanical testing provides a method for determining the storage and the loss moduli and the dampening factor as a function of temperature, frequency, time or a combination thereof. A graphic plot of these factors provides a graphic representation of elasticity and dampening as a function of temperature or frequency.

The Dynamic Mechanical Thermal Analyzer ™ (DMTA), made by Polymer Laboratories was used. This instrument subjects the sample to small amplitude sinusoidal oscillation. Testing was done in a shear geometry. The shear storage modulus (G'), the shear loss modulus (G'') and the dampening factor (tan δ) were measured at a frequency of oscillation of 3 Hertz over a temperature range of $-100°$ C. to $150°$ C., at a heating rate of $2°$ C. per minute according to the American Standard Testing M., No. D4065-82.

90° Peel Adhesion

The adhesive layer to be tested is transferred to 0.127 mm thick, anodized aluminum foil backing which then is slit to a width of 2.54 cm (1 inch). The resulting tape is self-adhered to a test plate under the weight of a 2.04-kg hard-rubber-covered steel roller, 2 passes in each direction. After exposure to the indicated conditions, "90° Peel Adhesion" is measured by moving the free end of the tape away from the steel plate at 90° and at a rate of about 0.5 cm per second (using a tensile tester).

Static Shear Test

A strip of 25.4-mm wide pressure-sensitive adhesive tape, as described above, is adhered to a smooth stainless steel plate with two passes of a 4.05 kg rubber-faced roller having a free end of the tape extending beyond the plate, the adhesion contact area being 25.4 mm by 25.4 mm. After 30 minutes room temperature dwell, the test sample is placed in 70° C. preheated oven and positioned 2° from vertical to prevent peeling. After 10 minutes in the oven, a 500 gm or 1,000 gm mass is suspended from the free end of the adhesive strip, and time to failure is reported. The test is discontinued if the tape has not failed after 10,000 minutes.

The following examples are for illustrative purposes only, and are not to be construed as limiting the invention. The invention is defined by the scope of the claims.

Comparative Example 1-C

Figure 2:
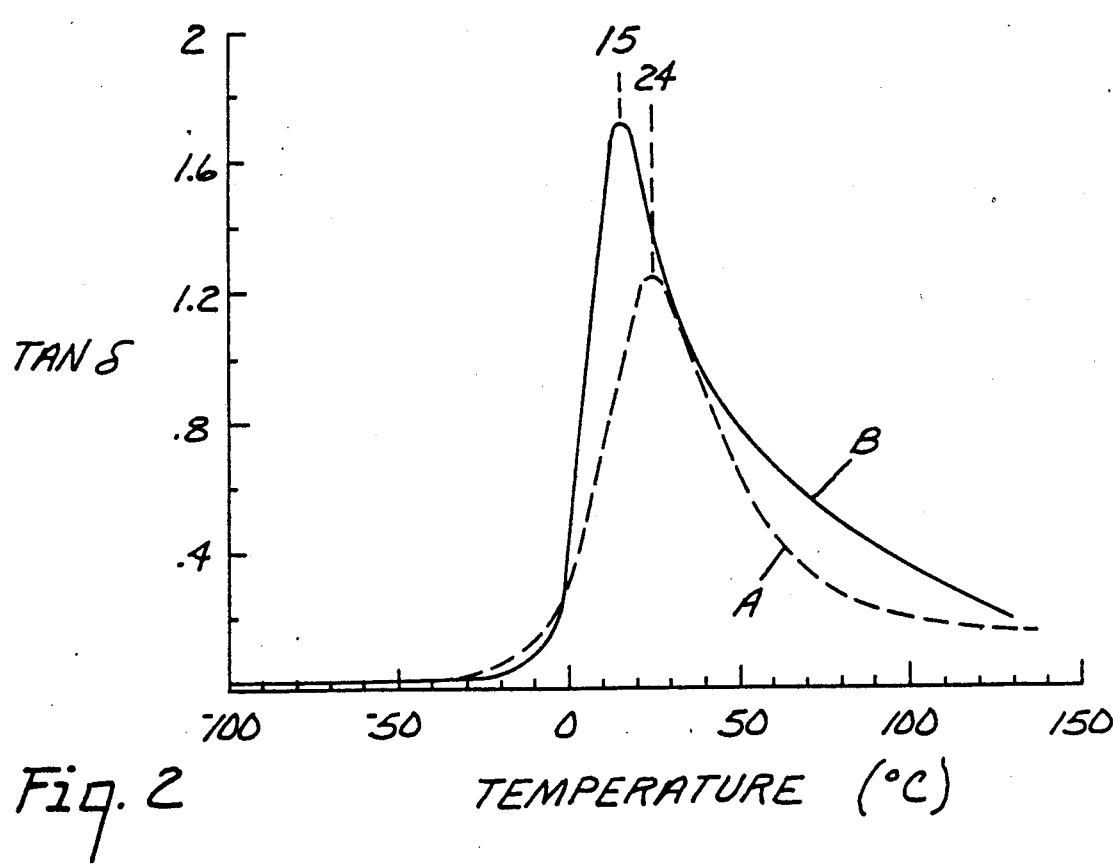
FIG. 2 is a plot of the log of the dampening maxima (tan δ) as determined by DMTA in relation to the temperature in degrees Celsius for the adhesive compositions in Examples 1-C (Line A) and 1 (Line B).

A pressure-sensitive adhesive tape was made by partially photopolymerizing a mixture of 76 parts isooctyl acrylate (IOA), 6 parts acrylic acid (AA) and 18 parts N-vinylpyrrolidone (NVP) in the presence of 0.04 parts of a photoinitiator, 2,2-dimethoxy-2-phenyl acetophenone, commercially available as Irgacure 651 ™ (IRG 651). The partial photopolymerization was accomplished in an inert (nitrogen) atmosphere using a bank of ultraviolet lamps to a viscosity of between 500–50,000 cps to provide a coatable syrup. To 75 parts of this syrup was then added 0 15 parts of 2,4-bistrichloromethyl-6(4-methoxyphenyl)- s-trizaine (XL-353), 0.15 parts of 1,6-hexanediol diacrylate (HDDA) and an additional 0.2 parts IRG 651. The mixture was coated onto a polyethylene coated paper release liner, the facing surface of which had a low adhesion release coating thereon to provide a coating thickness of about 0.127 mm, and then exposed to a bank of ultraviolet lamps for a total exposure energy of 500 millijoules under inert atmosphere. The sample was tested for 90° peel adhesion, and 70° shear. Results are, shown in Table I. The sample was also tested using DMTA; the results appear in FIGS. 1 and 2 as Line A.

EXAMPLE 1

A pressure-sensitive adhesive tape was made by partially photopolymerizing a mixture of 76 parts isooctyl acrylate (IOA), 6 parts acrylic acid (AA) and 18 parts N-vinylpyrrolidone (NVP) in the presence of 0.04 parts 2,2-dimethoxy-2-phenyl acetophenone (IRG 651). The partial photopolymerizing was accomplished in an inert (nitrogen) atmosphere using a bank of ultraviolet lamps to a viscosity of between 500–50,000 cps to provide a coatable syrup. To 75 parts of this syrup was then added 25 parts of Foral 85 ™, 0.15 parts of 2,4-bistrichloromethyl6(4-methoxyphenyl)-s-triazline (XL-353), 0.15 parts of 1,6-hexanediol diacrylate (HDDA) and an additional 0.2 parts IRG 651. The mixture was coated onto a polyethylene coated paper release liner, the facing surface of which had a low adhesion release coating thereon to provide a coating thickness of about 0.127 mm, and then exposed to a bank of ultraviolet lamps for a total exposure energy of 500 mjoules under inert atmosphere. The sample was then tested for 90° peel adhesion, 70° shear. Results are shown in Table I. The sample was also tested using DMTA; the results appear in FIGS. 1 and 2 as Line B. As can clearly be seen from these plotted data, the $T_g$ (as indicated by the tan δ) has shifted to lower temperatures, and the transition phase has sharpened as is indicative of adhesive compositions of the invention.

TABLE I

| Example | 90° peel adhesion polypropylene (N/dm) | 70° C. Shear 500 gm. wt. (Mins) |
|---------|----------------------------------------|----------------------------------|
| 1       | 208                                    | 10,000+                          |
| 1-C     | tack-free                              | POF*                             |

*Pop-off failure leaving no residue.

EXAMPLES 2, 2-C and 2-C$_2$

These were made similar to Example 1 except the ratios of monomers were in the photopolymerized terpolymer were 90 parts isooctyl acrylate, 6 parts AA and 4 parts N-vinyl pyrrolidone. Example 2-C is an identical terpolymer containing no tackifying agent. Example 2-C$_2$ *is an identical terpolymer containing* 30% of a non-rosin ester based tackifier, isobornyl methacrylate. The samples were tested using DMTA; the results appear in FIGS. 3 and 4; Example 2 is line D, Example 2-C as Line C, and Example 2-C$_2$ is line E. As can clearly be seen from these plotted data, the $T_g$ (as indicated by the tan δ) of Example 2 has shifted to lower temperatures when compared to 2-C, and the transition phase (the slope of the curve) has sharpened as is indicative of adhesive compositions of the invention. Observing Example 2-C$_2$, it can readily be seen that the $T_g$ (as indicated by the tan δ) has shifted to higher temperatures when compared to 2-C, and the transition phase has not sharpened.

The sample was also tested for 90° peel adhesion and room temperature shear and the results are shown in Table II.

TABLE II

| Example | 90° peel adhesion polypropylene (N/dm) | RT Shear 1000 gm. wt. (Mins) |
| --- | --- | --- |
| 2 | 75 | 161 |
| 2-C | 65 | 10,000 |

EXAMPLE 3 and 3-C

Figure 5:
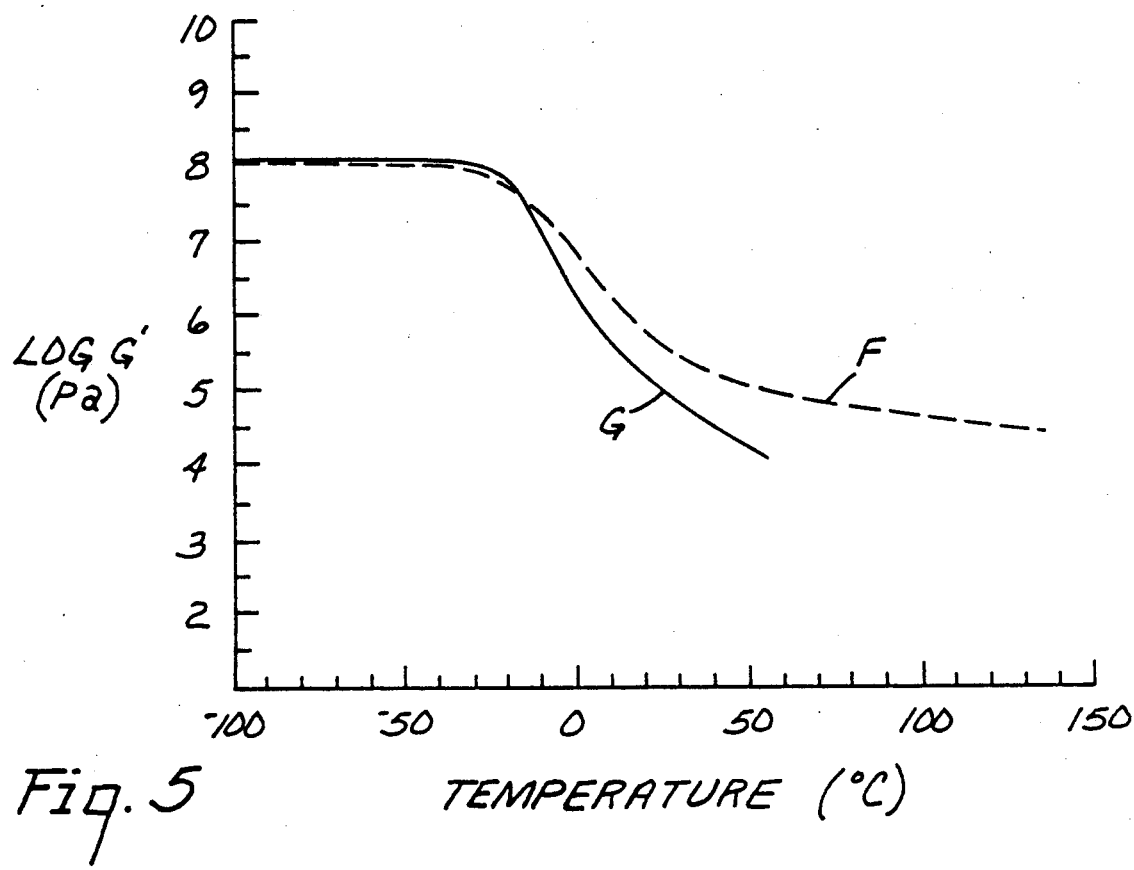
FIG. 5 is a plot of the log storage modulus as determined by DMTA in relation to the temperature in degrees Celsius for the adhesive compositions in Example 3-C (Line F) and Example 3 (Line G).
Figure 6:
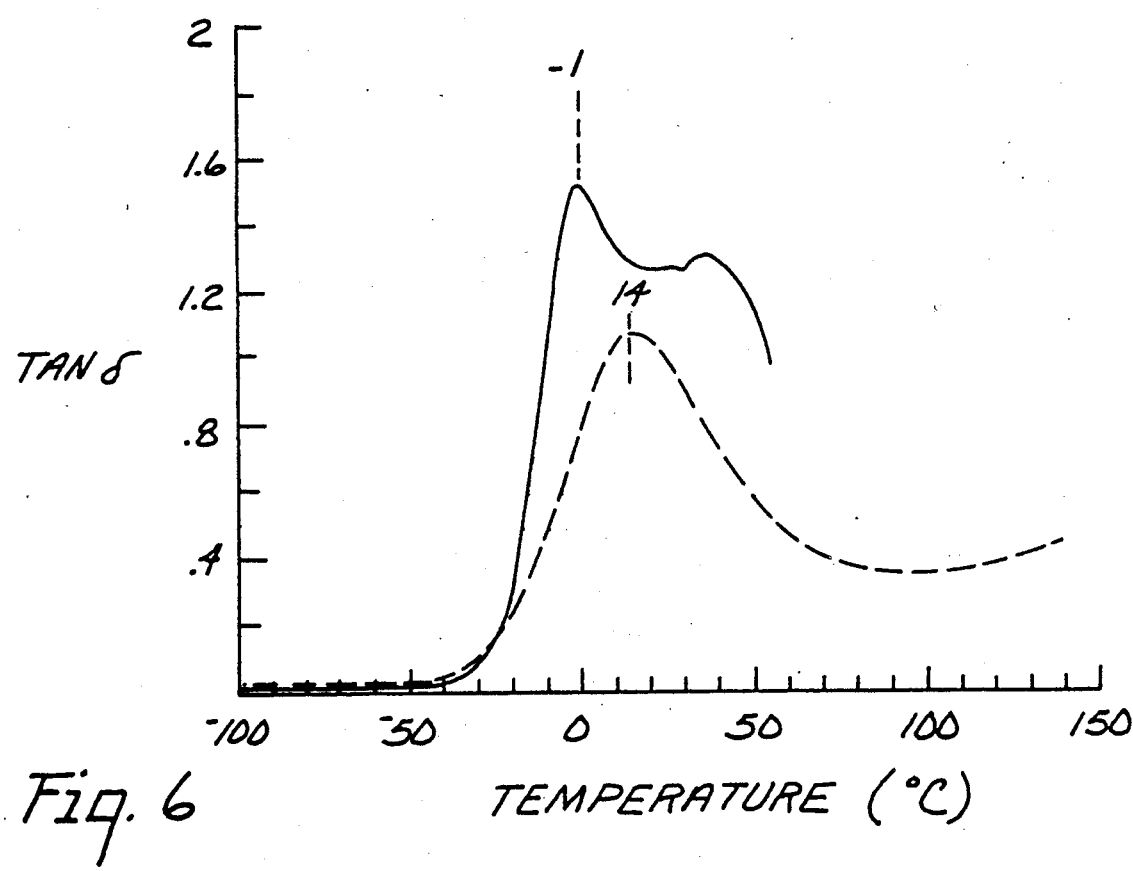
FIG. 6 is a plot of the dampening maxima (tan δ) as determined by DMTA in relation to the temperature in degrees Celsius for the adhesive compositions in Examples 3 (Line F) and 3-C (Line G).

These were made similar to Example 1 except that a different rosin ester based tackifier, Foral TM 65 is used. Example 3-C is an identical terpolymer containing no tackifying agent. The samples were tested using DMTA; the results appear in FIGS. 5 and 6; Example 3 as line G, Example 3-C as Line F. As can clearly be seen from these plotted data, the $T_g$ (as indicated by the tan δ) of Example 3 has shifted to lower temperatures when compared to 3-C, and the transition phase (the slope of the curve) has sharpened as is indicative of adhesive compositions of the invention.

EXAMPLE 4 and 4-C

Figure 7:
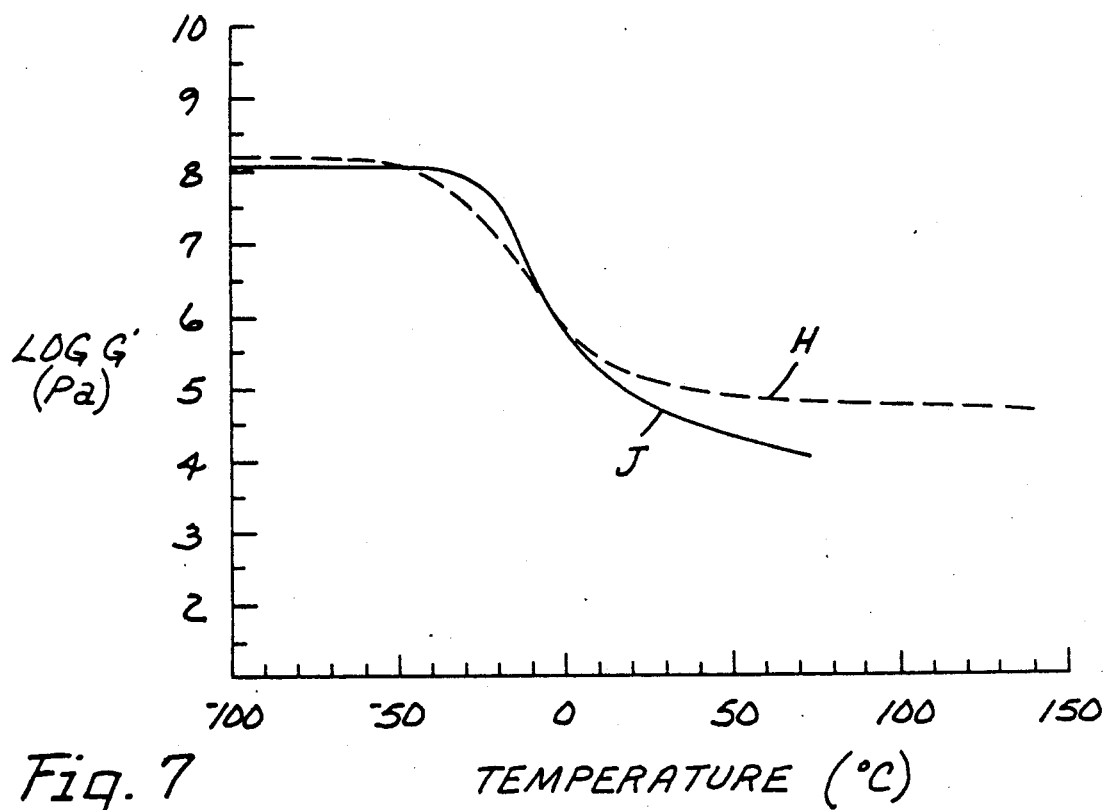
FIG. 7 is a plot of the log storage modulus (G') as determined by DMTA in relation to the temperature in degrees Celsius for the adhesive compositions in Examples 4 (Line J) and 4-C (Line H).
Figure 8:
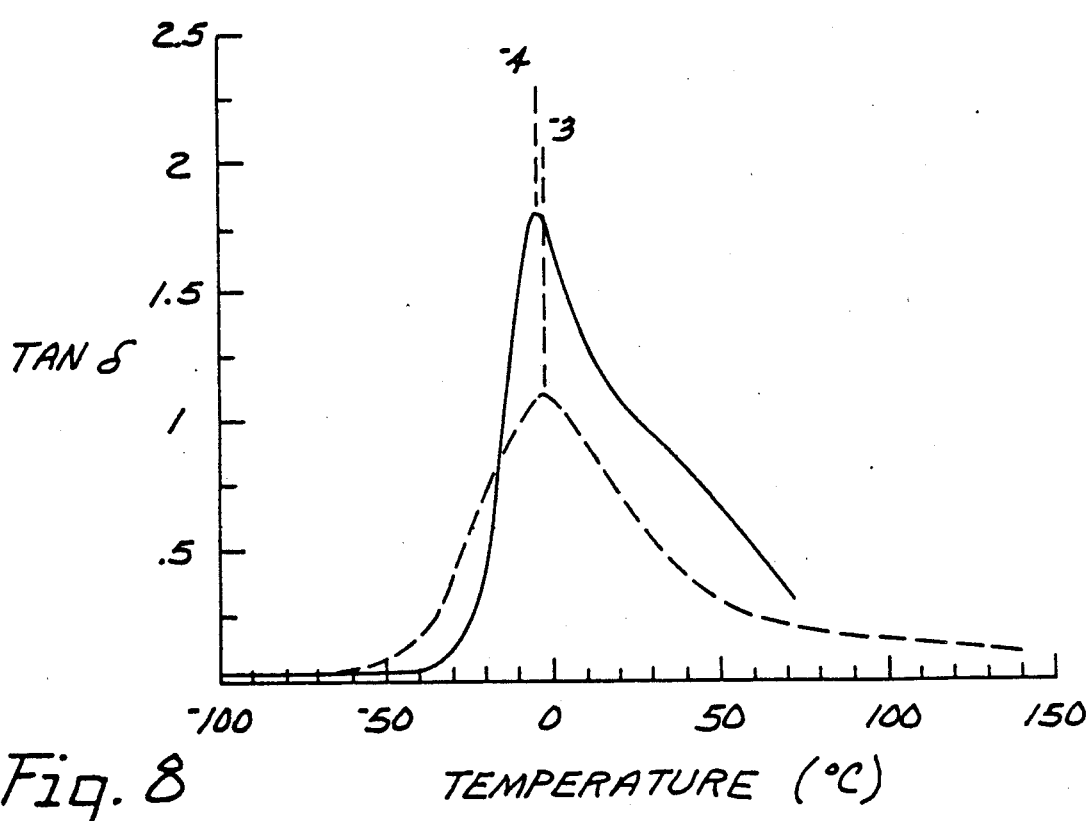
FIG. 8 is a plot of the dampening maxima (tan δ) as determined by DMTA in relation to the temperature in degrees Celsius for the adhesive compositions in Examples 4 (Line J) and 4-C (Line H).

These were made similar to Example 1 except that a different alkyl acrylate ester, isononyl acrylate was used. Example 4-C is an identical terpolymer containing no tackifying agent. The samples were tested using DMTA; the results appear in FIGS. 7 and 8; Example 4 as line J, Example 4-C as Line H. As can clearly be seen from these plotted data, the $T_g$ (as indicated by the tan δ) of Example 4 has shifted to lower temperatures when compared to 4-C, and the transition phase (the slope of the curve) has sharpened as is indicative of adhesive compositions of the invention.

EXAMPLES 5-8

These were made similar to Example 1 except different ratios of monomers, Foral-85 and crosslinkers were used. These were tested in the same way as Example 1 and the results are shown in Table III.

TABLE III

| Ex. | Monomer Ratios | | | Foral 85 (parts) | HDDA (parts) | 90° Peel polypropylene (N/dm) | 70° Shear 1000 g (min) |
| --- | --- | --- | --- | --- | --- | --- | --- |
| | IOA (parts) | AA (parts) | NVP (parts) | | | | |
| 5 | 84 | 6 | 10 | 15 | .15 | 133 | 10,000+ |
| 6 | 82 | 4 | 14 | 20 | .20 | 129 | 10,000+ |
| 7 | 76 | 8 | 16 | 20 | .20 | 120 | 10,000+ |
| 8 | 78 | 8 | 14 | 30 | .20 | 186 | 10,000+ |

EXAMPLES 9-19

These samples were made similar to Example 1 except with different ratios of monomers, Foral-85 TM and crosslinkers and at a thickness of 0.05 mm were used. These samples were also tested in a similar way as Example 1, except shear was done at room temperature and with a 1000 gm wt.

The results are shown in Table IV.

TABLE IV

| Ex. | Monomer Ratios | | | Foral 85 (parts) | HDDA (parts) | 90° Peel polypropylene (N/dm) | Room temp Shear 1000 g (min) |
| --- | --- | --- | --- | --- | --- | --- | --- |
| | IOA | AA | NVP | | | | |
| | (parts) | | | | | | |
| 9 | 89 | 3 | 8 | 15 | .05 | 47 | 4200 |
| 10 | 93 | 3 | 4 | 15 | .05 | 41 | 1400 |
| 11 | 91 | 5 | 4 | 15 | .05 | 42 | 10,000+ |
| 12 | 93 | 3 | 4 | 25 | .05 | 56 | 59 |
| 13 | 91 | 5 | 4 | 25 | .05 | 46 | 100 |
| 14 | 93 | 3 | 4 | 15 | .15 | 45 | 5500 |
| 15 | 89 | 3 | 8 | 15 | .15 | 37 | 10,000+ |
| 16 | 92 | 2 | 6 | 20 | .10 | 44 | 800 |
| 17 | 88 | 6 | 6 | 20 | .10 | 47 | 10,000+ |
| 18 | 90 | 4 | 6 | 10 | .10 | 56 | 10,000+ |
| 19 | 90 | 4 | 6 | 30 | .10 | 67 | 140 |

What is claimed is:

1. An acrylic terpolymer pressure-sensitive adhesive comprising
   (a) from about 60 parts to about 95 parts of a photopolymerized polymer of monomers containing:
      (1) from about 60 parts to about 96 parts of an alkyl acrylate monomer, the alkyl groups having an average of 6 to 12 carbon atoms,
      (2) from about 2 parts of about 15 parts of a first polar copolymerizable monomer, said polar monomer being a strongly polar monomer, and
      (3) from about 2 parts to about 25 parts of a second polar copolymerizable monomer selected from the group consisting of strongly polar and moderately polar monomers,
   (b) correspondingly, from about 40 parts to about 5 parts of a hydrogenated rosin ester tackifying agent, and
   (c) from about 0.01 to about 1 parts of a photoinitiator, wherein said adhesive has a lower glass transition temperature than would an identical acrylic terpolymer adhesive omitting said tackifying agent.

2. An acrylic terpolymer pressure-sensitive adhesive according to claim 1 wherein said tackifying agent is selected from the group consisting of hydrogenated glycerine esters, and hydrogenated pentaerithritol.

3. An acrylic terpolymer pressure-sensitive adhesive according to claim 1 wherein said tackifying agent is a hydrogenated glycerine ester.

4. An acrylic terpolymer pressure-sensitive adhesive according to claim 1 comprising from about 25 parts to about 35 parts of said tackifying agent.

5. An acrylic terpolymer pressure-sensitive adhesive according to claim 1 wherein said alkyl acrylate monomer is selected from the group consisting of isooctyl acrylate, isononyl acrylate, 2-ethyl-hexyl acrylate, decyl acrylate, dodecyl acrylate, and hexyl acrylate.

6. An acrylic terpolymer pressure-sensitive adhesive according to claim 5 wherein said alkyl acrylate monomer is selected from the group consisting of isooctyl acrylate, isononyl acrylate, and dodecyl acrylate.

7. An acrylic terpolymer pressure-sensitive adhesive according to claim 1 wherein said first polar monomer is selected from the group consisting of acrylic acid, itaconic acid, hydroxyalkyl acrylates, cyanoalkyl acrylates, acrylamides and substituted acrylamides.

8. An acrylic terpolymer pressure-sensitive adhesive according to claim 7 wherein said second polar monomer is a moderately polar monomer selected from the group consisting of N-vinyl pyrrolidone, N-vinyl caprolactam, acrylonitrile, vinyl chloride and diallyl phthalate.

9. An acrylic terpolymer pressure-sensitive adhesive according to claim 1 comprising an alkyl acrylate monomer and a first strongly polar monomer, and a second strongly polar monomer.

10. An acrylic terpolymer pressure-sensitive adhesive according to claim 1 wherein said photopolymerized polymer comprises
   (a) from about 60 parts to about 96 parts isooctyl acrylate,
   (b) from about 2 parts to about 15 parts acrylic acid, and
   (c) from about 2 parts to about 25 parts N-vinyl pyrrolidone.

* * * * *

UNITED STATES PATENT AND TRADEMARK OFFICE
CERTIFICATE OF CORRECTION

PATENT NO.     :    4,988,742

DATED          :    Jan. 29, 1991

INVENTOR(S)    :    Moon, Sheridan, Stark Jr.

It is certified that error appears in the above-identified patent and that said Letters Patent is hereby corrected as shown below:

Column 2, Line 37, "-substituted -halomethyl-", delete the space -- -substituted-halomethyl- --

Column 5, Line 21, "70 parts about 85", should read -- 70 parts to about 85 --

Column 7, Line 23, "approxim,ately", delete the comma -- approximately --

Column 9, Line 62, "added 0 15 parts", insert decimal point -- added 0.15 parts --

Column 10, Line 19, "chloromethyl6", insert hyphen -- chloromethyl-6 --

Column 10, Line 19, "-s-triazline", should be spelled -- -s-triazaine --

Column 10, Line 52, "is an identical terpolymer containing", should not be italicized Column 10, Line 48, "monomers were in", should read -- monomers in --

Column 12, Line 34, "2 parts of about", should read -- 2 parts to about --

Signed and Sealed this

Fifth Day of January, 1993

*Attest:*

DOUGLAS B. COMER

*Attesting Officer*          Acting Commissioner of Patents and Trademarks